United States Patent [19]

Suda

[11] Patent Number: 5,148,716

[45] Date of Patent: Sep. 22, 1992

[54] PLANE MOTION MECHANISM

[75] Inventor: Hiroharu Suda, Tokyo, Japan

[73] Assignees: Nippon Connecticut Saw Co.; Una Data Ltd., both of Tokyo, Japan

[21] Appl. No.: 731,064

[22] Filed: Jul. 17, 1991

[30] Foreign Application Priority Data

Jul. 20, 1990 [JP] Japan .................................. 2-190671
Jul. 1, 1991 [JP] Japan .................................. 3-256037

[51] Int. Cl.⁵ ..................... G05G 11/00; F16H 19/06; A47B 13/00
[52] U.S. Cl. .................................... 74/479; 74/89.22; 108/20; 248/178; 248/651
[58] Field of Search ................. 74/89.22, 479; 108/20; 248/178, 186, 651, 660

[56] References Cited

U.S. PATENT DOCUMENTS

| Re. 32,414 | 5/1987 | Hutchins et al. | 74/89.22 X |
| 3,273,408 | 9/1966 | Nagel et al. | 74/89.22 X |
| 3,611,819 | 10/1971 | Muller et al. | 74/89.22 |
| 4,392,140 | 7/1983 | Bastian et al. | 74/89.22 X |
| 4,710,819 | 12/1987 | Brown | 248/660 X |
| 4,922,173 | 5/1990 | Lawler | 74/89.22 X |

Primary Examiner—Allan D. Herrmann
Attorney, Agent, or Firm—Lowe, Price, LeBlanc & Becker

[57] ABSTRACT

In a plane motion mechanism, a table is mounted on a top planar surface of a base for movement thereon in plane motion. One end portions of respective first, second and third power transmitting elements adjacent respectively to one ends thereof are wound about an outer peripheral side surface of the table. At least two, first and second, drive units are provided, to which the other ends of the respective first and second power transmitting elements are connected respectively, for applying tension forces respectively to the first and second power transmitting elements. A tension-applying unit, to which the other end of the third power transmitting unit is connected, is provided for applying a tension force to the third power transmitting element. The table may be circular in cross-section and having an outer peripheral side surface. At least pair of first and second elongated power transmitting units may extend in contact with an outer peripheral side surface of the table to generate friction between the first and second power transmitting units and the outer peripheral side surface of the table. A pair of drive units may be provided for driving the first and second power transmitting elements, respectively.

33 Claims, 11 Drawing Sheets (A)

(B)

(A)

(B)

(A)

(B)

(C)

(D)

PLANE MOTION MECHANISM

FIELD OF THE INVENTION

This invention relates to an automatization apparatus for machining processing, assembling, measuring, inspection and the like and, more particularly, to a plane motion mechanism suitable for determining a position and a posture of a table in a plane.

BACKGROUND OF THE INVENTION

As is known well, a motion in a plane has three degrees of freedom. Generally, the motion is realized by the use of three joints. For example, positioning of a work on a machining center is practiced such that a slide table in a Y-direction is mounted on a slide table in an X-direction, and a rotary table in a $\theta$-direction is mounted on an assembly including the slide tables in the X- and Y-directions, to control three axes including X, Y and $\theta$. This is called an orthogonal coordinate system.

Further, in a horizontal multiple-joint robot, an upper arm is moved angularly by a shoulder joint through $\theta_1$, a front arm is moved angularly by an elbow joint through $\theta_2$, and a hand is rotated by a wrist joint through $\theta_3$, to control three axes including $\theta_1$, $\theta_2$ and $\theta_3$, thereby obtaining a position and a posture (X, Y, $\theta$). The following relationship exists between $\theta_1$, $\theta_2$ and $\theta_3$ and X, Y and $\theta$:

$$X = l_1\cos\theta_1 + l_2\cos(\theta_1+\theta_2)$$

$$Y = l_1\sin\theta_1 + l_2\sin(\theta_1+\theta_2)$$

$$\theta = \theta_1 + \theta_2 + \theta_3$$

In this manner, in the prior art, the arrangement is such that a first axis is mounted on a motion of a second axis, and the last axis is mounted on an assembly including the first and second axes. For this reason, the axis in the lowermost layer must move drive mechanisms and guide mechanisms for the respective upper two layers including the second and third axes. Thus, a large power is required.

Further, in the orthogonal coordinate system, not only an area approximate to an area twice strokes required are necessary, but also a considerable thickness is required because of three layers. Furthermore, there is a problem that the orthogonal coordinate system cannot obtain sufficient speed as compared with the horizontal multiple-joint robot.

On the one hand, only a small area is required for the horizontal multiple-joint robot. However, there is such a problem that rigidity and accuracy cannot be obtained as compared with the orthogonal coordinate system, because of a cantilever.

SUMMARY OF THE INVENTION

It is therefore an object of the invention to provide a plane motion mechanism which can occupy only a small or narrow area and which requires only an extremely thin structure or construction, so that the plane motion mechanism can withstand further high speed, high accuracy and high load.

According to the invention, there is provided a plane motion mechanism comprising:

a base having a top planar surface;

a table mounted on the top planar surface of the base for movement thereon in plane motion, the table having an outer peripheral side surface;

at least three, first, second and third, elongated power transmitting means having their respective one and other ends, one end portions of the respective first, second and third power transmitting means adjacent respectively to the one ends thereof being wound about the outer peripheral side surface of the table;

at least two, first and second, drive means to which the other ends of the respective first and second power transmitting means are connected respectively, for applying tension forces respectively to the first and second power transmitting means; and tension-applying means to which the other end of the third power transmitting means is connected, for applying a tension force to the third power transmitting means.

With the arrangement of the invention, it is possible to freely slide the table under winding control of the elongated power transmitting means. Accordingly, there can be provided a plane motion of high speed, high accuracy and high load by a small area and a thin construction. Further, all the drive means move the table without intervening of other drive means. Thus, there is provided a superior advantage that it is possible to eliminate wasteful energy for moving the other drive means and various guides.

It is preferable that a plane motion mechanism includes four cylindrical elements having their respective cylindrical outer peripheral side surfaces, the cylindrical elements being fixedly mounted to the base respectively at the four corners of the imaginary rectangle on the top planar surface of the base, the four belts passing respectively about the cylindrical outer peripheral side surfaces of the respective cylindrical elements so that the four belts are decided in their respective tensile directions.

With the above arrangement of the invention, when the other end of each of the belts having one end thereof wound about the table is taken up, the table is moved angularly in a direction in which the belt is pulled, or is moved linearly. If the tensile directions of the belts are decided, since the drive means and the table are connected to each other, the table is moved angularly in a predetermined direction or is moved linearly.

An amount of the movement can be controlled by a winding amount of the belts due to the drive means. Assuming that the table is circular in cross-section in plan, and a radius of the table is b. In order to restrict the tensile direction of the belts, the cylindrical elements are mounted to respectively at corners of the imaginary rectangle so as to extend vertically. Assume that a radius of the cylindrical element is a, a position of the table is (x, y), a posture of the table is $\theta$, and positions of the cylindrical elements include $P_1(x_0, y_0)$, $P_2(-x_0, y_0)$, $P_3(-x_0, -y_0)$, $P_4(x_0, -y_0)$. Then, the lengths of the respective belts to the cylindrical elements can be obtained by the following equations:

$$l_1 = -b\phi + \sqrt{(x-x_0)^2 + (y-y_0)^2 - (a+b)^2} + \left(\sin^{-1}\frac{a+b}{\sqrt{(x-x_0)^2 + (y-y_0)^2}} + \tan^{-1}\frac{y-y_0}{x-x_0}\right)(a+b)$$

-continued $$l_2 = +b\phi + \sqrt{(x + x_0)^2 + (y - y_0)^2 - (a + b)^2} +$$

$$\left( \sin^{-1} \frac{a + b}{\sqrt{(x + x_0)^2 + (y - y_0)^2}} - \tan^{-1} \frac{y - y_0}{x + x_0} \right)(a + b)$$

$$l_3 = -b\phi + \sqrt{(x + x_0)^2 + (y + y_0)^2 - (a + b)^2} +$$

$$\left( \sin^{-1} \frac{a + b}{\sqrt{(x + x_0)^2 + (y + y_0)^2}} + \tan^{-1} \frac{y + y_0}{x + x_0} \right)(a + b)$$

$$l_4 = +b\phi + \sqrt{(x - x_0)^2 + (y + y_0)^2 - (a + b)^2} +$$

$$\left( \sin^{-1} \frac{a + b}{\sqrt{(x - x_0)^2 + (y + y_0)^2}} - \tan^{-1} \frac{y + y_0}{x - x_0} \right)(a + b)$$

It is preferable that the first, second, third and fourth drive means are drive motors for pulling the four belts, respectively, and wherein the plane motion mechanism further includes a control unit for controlling the first, second, third and fourth drive motors.

With the above arrangement of the invention, if the four belts are brought respectively to their respective lengths described above, there can be obtained a value of (x, y, θ). This holds not only in the case of four points, but also in the case of any optional number of points equal to or higher than three. In view of this, if the lengths of the respective belts, i.e., winding amounts are programed in the control device of the drive means for each axis, the table moves on the table in accordance with the program. Thus, the table can take free positions and postures. Further, if the tension force is applied to the belts, there can be provided rigidity of the position and posture in the plane. In the case where a request is not sever with respect to the thickness of the plane motion mechanism, the drive means can directly be mounted on the base at the corners in place of the cylindrical elements.

Further, according to the plane motion mechanism of the invention, in order to raise accuracy of angular movement of the table, one end of the belt is wound about the table and is fixedly connected thereto. Alternatively, the belts extending through the opposed corners on the base can be wound about the table. In the latter case, it is a necessary condition that the belts cannot slide along the grooves in the table. Furthermore, since the grooves in the table are brought to helical configuration, the thickness of the mechanism increases for necessary rotational speed, on the other hand, it is possible to reduce the length of the belt. Thus, there can be produced such a superior advantage that it is possible to rotate the table through revolutions regardless of the length of the belt.

On the other hand, in such control of the table, positioning is possible in the case where (x, y, θ) of a tool of a lathe or the like is controlled. In the case where the control of the table is applied to a tool of a milling machine or the like, which requires continuous rotation, however, it is necessary to wind the belt about the table and direction restricting pulleys through a plurality of turns. Accordingly, the diameter of the table of the pulley varies or changes depending upon the number of turns. For this reason, since the actual table diameter and the actual pulley diameter are not aligned with the diameter data within the control program, there is a possibility that errors occurs in the positional control. Of course, it is possible to successively calculate and correct the variable diameter data from the table position and the like. However, a program to be prepared will become complicated. Further, there is a limit in length in the case of the use of the belt. Accordingly, there occurs a limit also in the rotational speed. Free control of rotation will become difficult.

According to the invention, there is also provided a plane motion mechanism comprising:

a base having a top planar surface;

a table mounted on the top planar surface of the base for movement thereon in plane motion, the table being circular in cross-section and having an outer peripheral side surface;

at least pair of first and second elongated power transmitting means extending in contact with the outer peripheral side surface of the table to generate friction between the first and second power transmitting means and the outer peripheral side surface of the table; and a pair of drive means for driving the first and second power transmitting means, respectively.

With the above arrangement of the invention, the use of the endless belts enables rotational speed of the table to have no limit. Accordingly, it is possible to control the table more freely. Further, since the table can be controlled in position regardless of the number of turns of the belts. Thus, there is provided an advantage that it is possible to realize a plane motion high in accuracy, by more simple arrangement.

Specifically, with the above arrangement of the invention, it possible to calculate the moving direction of the table on the basis of the vector composition or analysis in the tensile direction of the endless belt. Furthermore, regarding the rotational speed, there occurs no limit. Accordingly, it is possible to freely move the table within the predetermined area on the table, and it is possible to move angularly the table at a predetermined control position without a limit.

DESCRIPTION OF THE PREFERRED EMBODIMENTS

Figure 1:
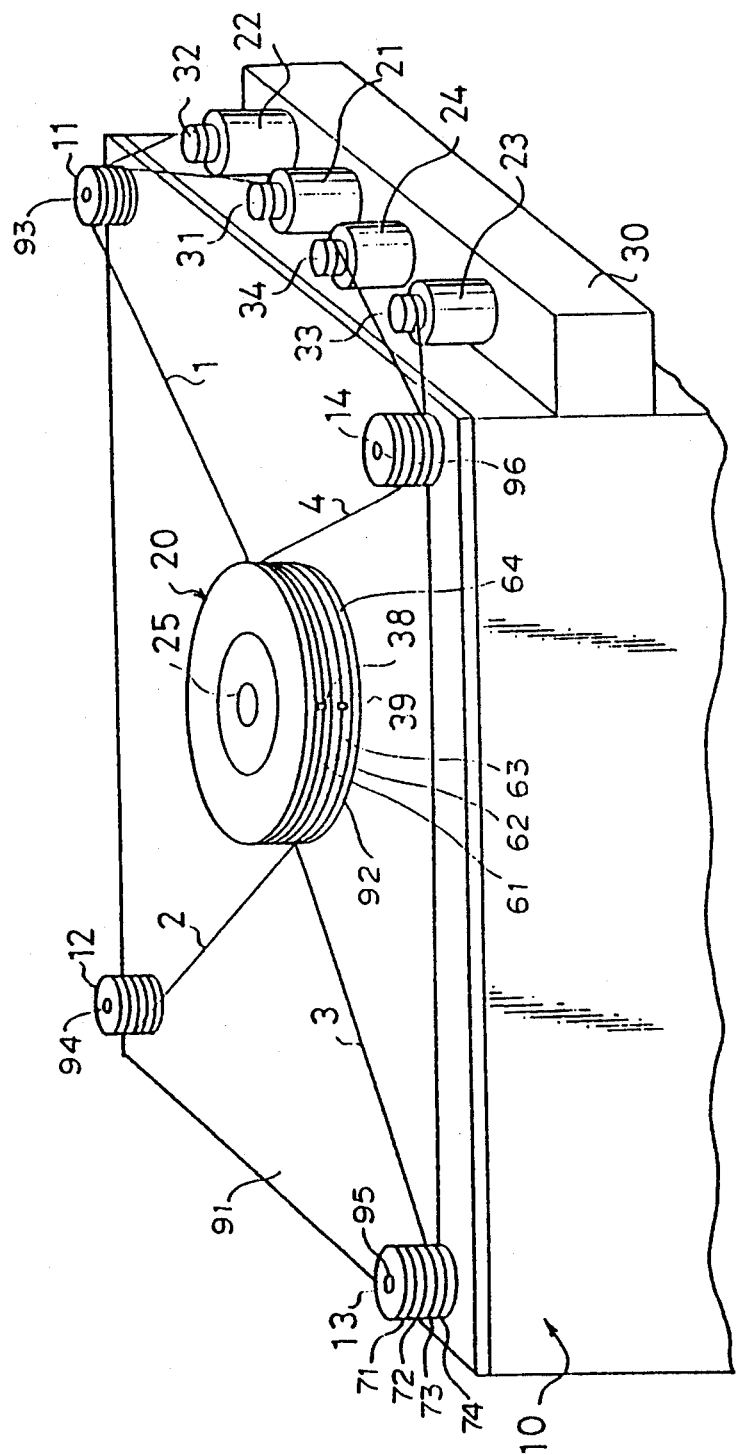
FIG. 1 is a perspective view of a plane motion mechanism according to a first embodiment of the invention.

Referring first to FIG. 1, there is shown a plane motion mechanism according to a first embodiment of the invention.

The plane motion mechanism comprises a base 10 having a top planar surface 91. The base 10 is mounted at a predetermined position in a vertical direction. A table 20 having a circular outer peripheral side surface 92 is mounted on the top planar surface 91 of the base 10 for linear movement and angular movement about an axis 25 thereon in plane motion. Four cylindrical elements 11, 12, 13 and 14 rotatable about their respective axes 93, 94, 95 and 96 have their respective cylindrical outer peripheral side surfaces. The axes 93, 94, 95 and 96 of the respective cylindrical elements 11, 12, 13 and 14 are fixedly mounted to the top planar surface 91 of the base 10 respectively at four corners of an imaginary rectangle on the top planar surface 91 of the base 10. First, second, third and four elongated power transmitting means, that is, four belts 1, 2, 3 and 4 pass respectively about the cylindrical outer peripheral side surfaces of the respective cylindrical elements 11, 12, 13 and 14 so that the four belts 1, 2, 3 and 4 are decided or determined in their respective tensile directions.

The other ends of the respective belts 1, 2, 3 and 4 are connected respectively to four tension-applying means or drive motors 21, 22, 23 and 24, for applying tension forces respectively to the belts 1, 2, 3 and 4, i.e., for pulling the belts, respectively. A control unit 30 is provided for controlling the drive motors 21, 22, 23 and 24. The drive motors 21, 22, 23 and 24 are mounted on a side surface of the base 10 so as to extend vertically. The drive motors 21, 22, 23 and 24 are so-called DD motors, respectively, having no reduction gears, which can generate high torque.

The drive motors 21, 22, 23 and 24 have their respective output shafts 31, 32, 33 and 34 to which the other ends of the respective belts 1, 2, 3 and 4 are fixedly connected. The belts 1, 2, 3 and 4 extend respectively about the cylindrical elements 11, 12, 13 and 14, and the one ends of the respective belts 1, 2, 3 and 4 are fixedly connected to the outer peripheral side surface 92 of the table 20 at their respective predetermined locations. In this connection, if the belts 1, 2, 3 and 4 vary in vertical position, the belts will be intertwined with each other. Thus, the table 20 is formed, in the outer peripheral side surface thereof, with a plurality of belt grooves 61, 62, 63 and 64. The one end portions of the respective belts 1, 2, 3 and 4 are wound about the outer peripheral side surface 92 of the table 20 respectively along the belt grooves 61, 62, 63 and 64 so that the belts 1, 2, 3 and 4 are regulated in their respective vertical positions. Moreover, each of the cylindrical elements 11, 12, 13 and 14 is formed, in its outer periphery, with a plurality of belt grooves 71, 72, 73 and 74. Each of the belts 1, 2, 3 and 4 extends along a corresponding one of the belt grooves 71, 72, 73 and 74 in the outer periphery of the cylindrical element 11, 12, 13 or 14.

In this connection, in the case where the belts 1, 2, 3 and 4 may be wound about the output shafts 31, 32, 33 and 34 of the respective motors 21, 22, 23 and 24 through a plurality of turns, the output shafts 31, 32, 33 and 34 are not required to be formed therein with grooves. In order to raise accuracy of the angular movement of the table 20, however, it is desirable that the output shafts 31, 32, 33 and 34 of the respective motors 21, 22, 23 and 24 are formed with grooves.

Figure 2:
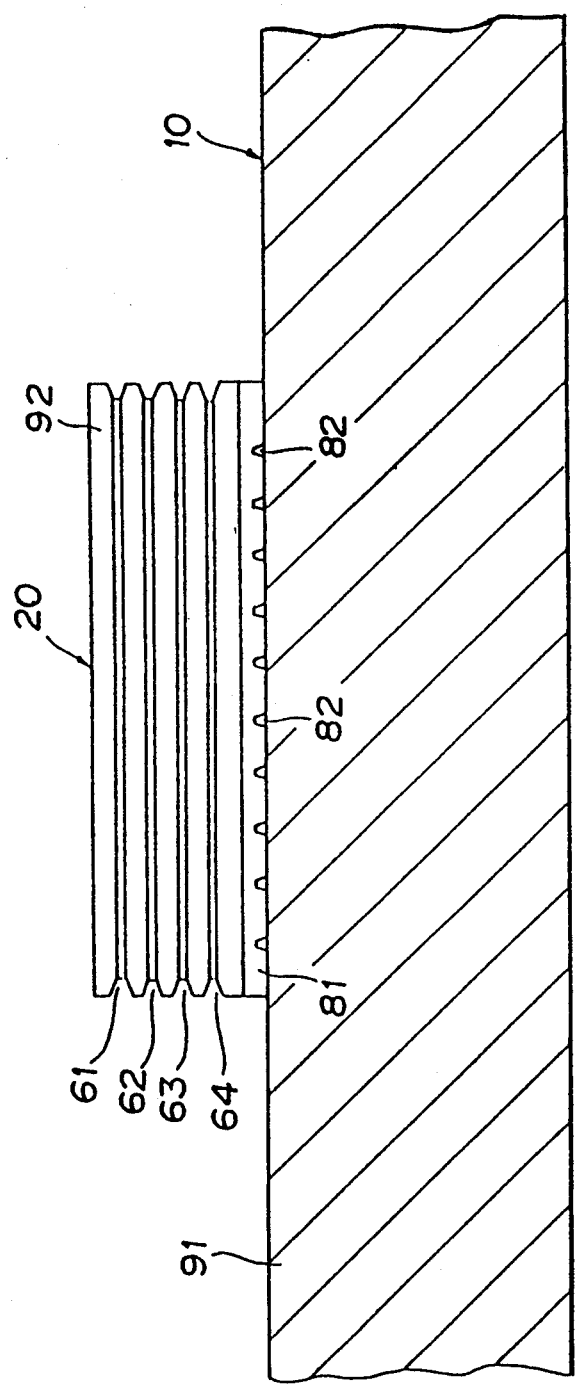
FIG. 2 is a fragmentary enlarged view of a base and a table mounted on a top planar surface of the base for linear and angular movement thereon, illustrated in FIG. 1.

As shown in FIG. 2, in order to smoothly move linearly and move angularly the table 20 on the top planar surface 91 of the base 10, relief means is provided for relieving friction between the top planar surface 91 of the base 10 and a lower surface of the table 20. The relief means is made of a polytetrafluoroethylene film 81 (trade name: Teflon) or the like which is mounted to the lower surface of the table 20. Further, the polytetrafluoroethylene film 81 has a lower surface thereof which is formed therein with a plurality of grooves 82 for retaining a film of lubricant.

Referring back to FIG. 1, the belts 1, 2, 3 and 4 are fixedly connected to the table 20 along their respective belt grooves 71, 72, 73 and 74 in the cylindrical elements 11, 12, 13 and 14 which are predetermined correspondingly to the belts 1, 2, 3 and 4, respectively. In the first embodiment illustrated in FIG. 1, the belt 1 is fixedly connected to the outer peripheral side surface 92 of the table 20 at a point 38 remotest from the cylindrical element 11 which is mounted on the top planar surface 91 of the base 10 at a right upper location, through the uppermost groove 71 in the cylindrical element 11. If the belt 1 extends about the outer peripheral side surface 92 of the table 20 through at least one turn or revolution along the groove 61, the table 20 can be moved angularly further through one turn or revolution. The peripheral side surface of each of the cylindrical elements 11, 12, 13 and 14, which is formed therein with the grooves 71, 72, 73 and 74, is rotatable about its axis 93, 94, 95 or 96.

Similarly, the belt 2 reaches the belt groove 62 in the outer peripheral side surface 92 of the table 20 through the second belt groove 72 in the outer peripheral side surface of the cylindrical element 12. The belt 2 passes about the belt groove 62 through one turn or revolution and, subsequently, is fixedly connected to the table 20 at a fixing point 39. The same is applicable to the belts 3 and 4, and their respective fixing points are located on a side opposite to the fixing points 38 and 39.

In order to move the table 20 to the right, the drive motors 21 and 24 take up the belts 1 and 4, respectively, while the other drive motors 22 and 23 loosen the belts 2 and 3, respectively. Further, in order to angularly move the table 20 in the clockwise direction, the belts 2 and 4 are taken up respectively about the output shafts 31 and 34 of the respective drive motors 21 and 24, while the belts 1 and 3 are loosened. The relationship between the motion of the table 20 and the belts 1, 2, 3 and 4 is indicated by the following table. The case where the belts, 1, 2, 3 and 4 are taken up is indicated by (+), while the case where the belts 1, 2, 3 and 4 are loosened is indicated by (−).

TABLE

|  | 1 | 2 | 3 | 4 |
| --- | --- | --- | --- | --- |
| RIGHT | + | − | − | + |
| LEFT | − | + | + | − |

TABLE-continued

|  | 1 | 2 | 3 | 4 |
| --- | --- | --- | --- | --- |
| UPPER | + | + | − | − |
| LOWER | − | − | + | + |
| CCW | + | − | + | − |
| CW | − | + | − | + |
| TAKING-UP | + | + | + | + |
| LOOSENING | − | − | − | − |

In connection with the above, an amount of movement of the table 20 is determined depending upon the lengths of the respective belts 1, 2, 3 and 4. However, the lengths of the respective belts 1, 2, 3 and 4 are beforehand calculated on the basis of the configuration and dimension of the table 20 and are stored in the control unit 30. Paths of the respective belts 1, 2, 3 and 4 may be taught by any of a playback system and a numerical control system. Further, it is possible to operate a joy stick or the like so that an operator manually commands X, Y and θ to drive the drive motors 21, 22, 23 and 24 on the basis of calculation.

According to the plane motion mechanism constructed as described above, the paths of the respective belts 1, 2, 3 and 4 are beforehand taught in the control unit 30, whereby it is possible to slide the table 20 freely to the position and posture of (X, y θ).

Furthermore, since the drive motors 21, 22, 23 and 24 can be mounted on the side surface of the base 10 so as to extend vertically, it is possible to form the planar motion mechanism to one far thinner than a conventional orthogonal coordinate system in which motor guides are arranged below a table through a plurality of stages. Moreover, the planar motion mechanism according to the first embodiment of the invention has no structures or constructions corresponding respectively to conventional ball screws and screw arms. Accordingly, a working or operational area of the table per se is brought to the dimension of the table. Thus, the planar motion mechanism according to the first embodiment of the invention is more superior in planar area than the orthogonal or horizontal joints.

Figure 3:
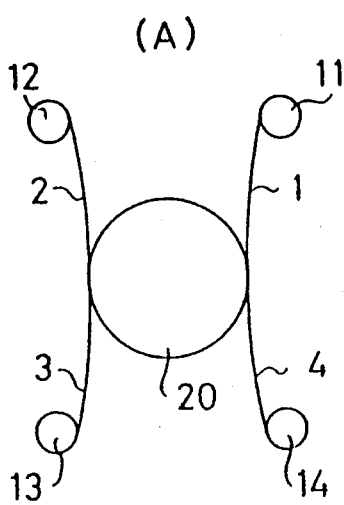
FIGS. 3(A) through 3(C) are views for explanation of four belts illustrated in FIG. 1 as to how the belts are wound.
Figure 3:
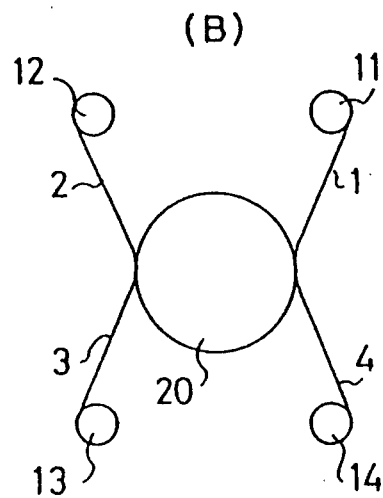
Figure 3:
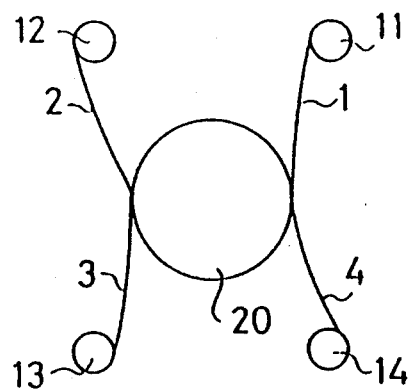
Figure 4:
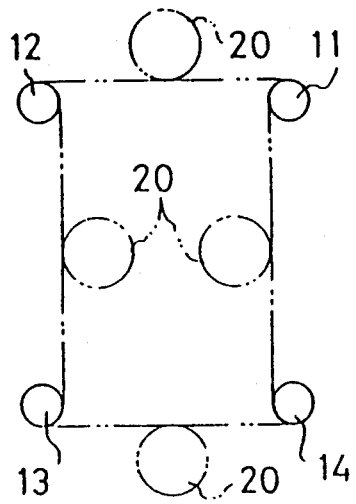
FIGS. 4(A) through 4(C) are views for explanation of a moving area or range of the table which moves under winding conditions illustrated in FIGS. 3(A) through 3(C)
Figure 4:
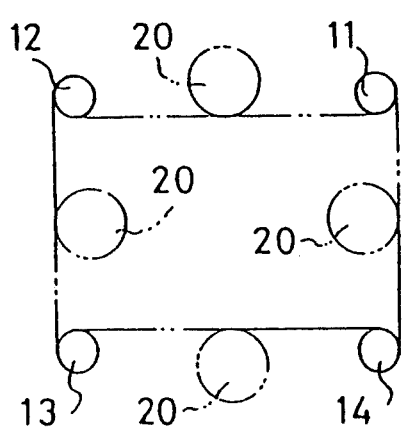
Figure 4:
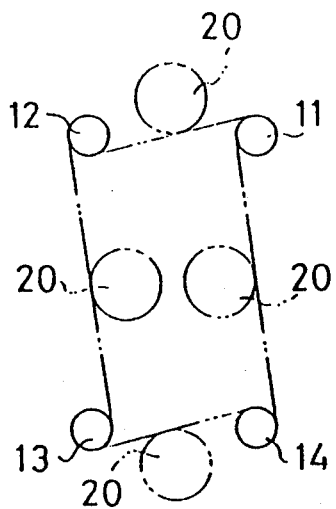

FIGS. 3(A), 3(B) and 3(C) show various variations of how to wind the belts 1, 2, 3 and 4 about the table 20. FIG. 3(A) shows a so-called "8"-shaped winding manner. In the case where the belts 1, 2, 3 and 4 are wound about the table 20 in the "8"-shaped winding manner, the table 20 moves in plane motion within an area indicated by two-dot-and-dash lines in FIG. 4(A). Further, FIG. 3(B) shows a so-called "0"-shaped winding manner. In the case where the belts 1, 2, 3 and 4 are wound about the table 20 in the "0"-shaped winding manner, the table 20 moves in plane motion within an area indicated by two-dot-and-dash lines in FIG. 4(B). Furthermore, FIG. 3(C) shows a winding manner which is to be called a so-called combination type of "8" and "0". In the case where the belts 1, 2, 3 and 4 are wound about the table 20 in the winding manner of the combination type of "8" and "0", the table 20 moves in plane motion within an area indicated by two-dot-and-dash lines in FIG. 4(C).

In connection with the above, the invention should not be limited to the above-described first embodiment, but various modification or variations may be made to the invention. For example, it is considered to use ball bearings, magnetic levitation, air bearings or the like, as means for moving linearly and moving angularly the table 20 smoothly. Further, it is possible to substitute chains and piano wires for the belts 1, 2, 3 and 4. It is considered that the belts 1, 2, 3 and 4 are made of an engineering plastic material. Furthermore, the drive motors 21, 22, 23 and 24 may be not only DD motors, but also DC motors, AC motors, brushless motors or the like. Moreover, it is also considered that the belts 1, 2, 3 and 4 are not directly connected respectively to the motors 21, 22, 23 and 24, but reduction gears may be used between the belts 1, 2, 3 and 4 and the motors 21, 22, 23 and 24. Further, the belts 1, 2, 3 and 4 may be drawn by their respective direct-acting piston/cylinder assemblies (not shown).

Figure 5:
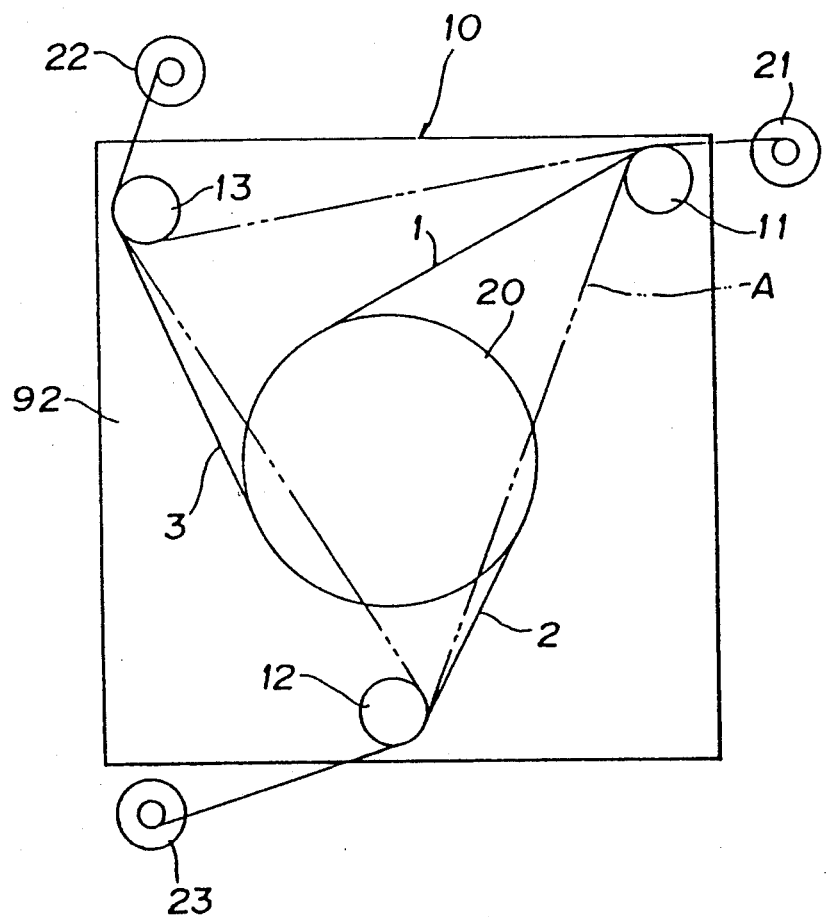
FIG. 5 is a top plan view showing a first modification of the first embodiment illustrated in FIG. 1.

FIG. 5 shows a first modification of the above-described first embodiment according to the invention, in which the table 20 is driven by three motors 21, 22 and 23. It will be seen that the table 20 can be moved straight and moved angularly within an area A of the top planar surface 92 of the base 10, which is surrounded by two-dot-and-dash lines in FIG. 5. That is, the first modification enables the table 20 to occupy any planar position and posture of (X, Y, θ). In this connection, in the modification shown in FIG. 5, the cylindrical elements 11, 12 and 13 are provided correspondingly to the number of the belts 1, 2 and 3.

Referring back to FIG. 1, it is natural that the tensile directions of the respective belts 1, 2, 3 and 4, the locations where the belts 1, 2, 3 and 4 are connected to the table 20, the vertical positions of the respective belts 1, 2, 3 and 4 and the vertical positions of the respective grooves 61, 62, 63, 64, 71, 72, 73 and 74 can also suitably be modified. For example, the (X, Y, θ) motion is possible, if the belts 1, 2, 3 and 4 are connected to the table 20 in the arrangements illustrated respectively in FIGS. 3(B) and 3(C).

Figure 6:
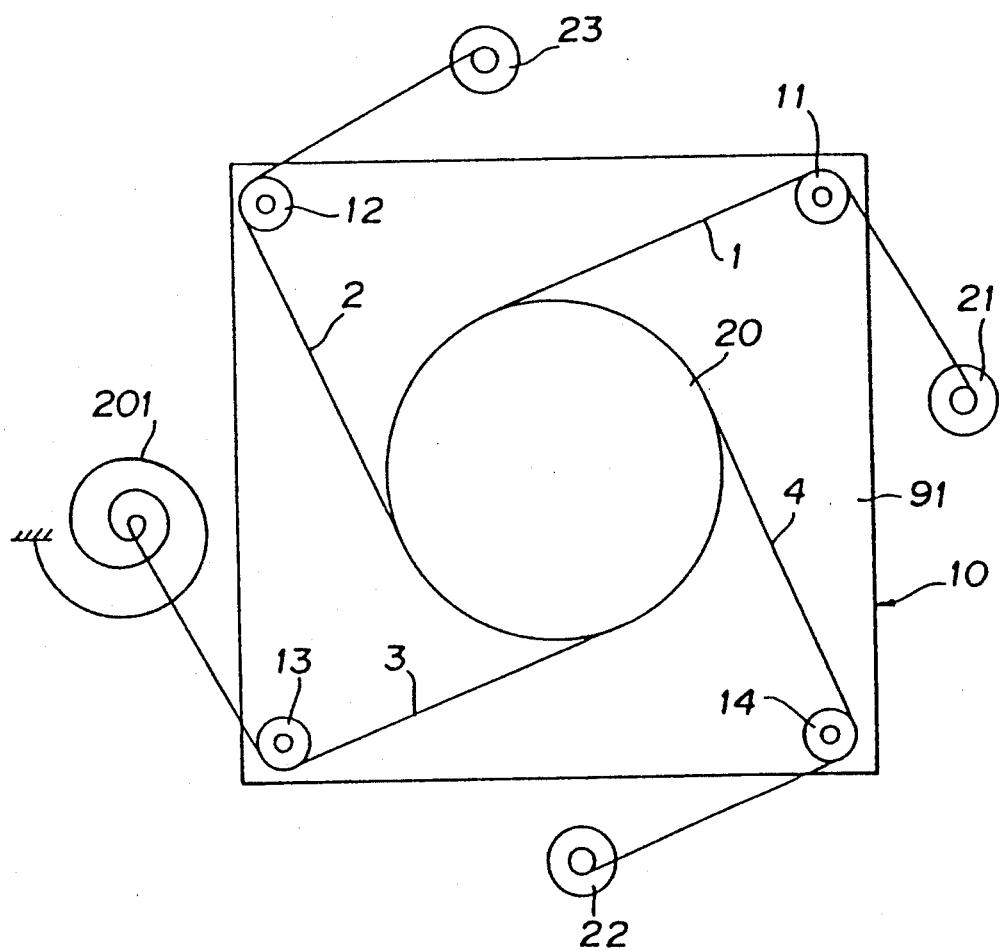
FIG. 6 is a top plan view showing a second modification of the first embodiment illustrated in FIG. 1.

FIG. 6 shows a second modification of the first embodiment illustrated in FIG. 1. In the second modification, a helical spring 201 is substituted for one of the drive motors 21, 22, 23 and 24. The helical spring 201 always applies a tension force to the belt 3, i.e., to the table 20. The helical spring 201 has intensity or spring constant which may suitably be set depending upon the weight of the table 20 or a subject load applied to the helical spring 201. It is of course that two or more helical springs may be substituted respectively for two of more drive motors 21, 22, 23 and 24.

In the first embodiment and the first and second modifications, the (X, Y, θ) motion of the table 20 is determined only depending upon the tensile directions of the respective belts 1, 2, 3 and 4 or 1, 2 and 3. Accordingly, if the cylindrical elements 11, 12, 13 and 14 or 11, 12 and 13 are decided or determined in position, there is produced such a degree of freedom that the drive motors 21, 22, 23 and 24 or 21, 22 and 23 may be placed or arranged anywhere.

In connection with the above, if it is desired to move the table 20 within a square on the top planar surface 91 of the base 10, the cylindrical elements 11, 12, 13 and 14 should be placed respectively at corners of an elongated rectangle.

Furthermore, even if the table 20 has an angular or square configuration in cross-section in plan, which hinders pulling or tension of the belts 1, 2, 3 and 4 or 1, 2 and 3, there is no problems if the belt grooves 61, 62, 63 and 64 have adequate radii of curvature, and if the lengths of the respective belts 1, 2, 3 and 4 or 1, 2 and 3 are stably determined.

If, in teaching of the paths of the respective belts 1, 2, 3 and 4 or 1, 2 and 3 to the control unit 30, the speed and the tension of each of the drive motors 21, 22, 23 and 24 or 21, 22 and 23 are so programmed as to be corrected automatically depending upon rotational speed of a tool, a configuration of a work, material and the kind of the used tool and the like, there can be provided necessary and sufficient rigidity. Moreover, the arrangement may be such that a plurality of sensors are provided for detecting items such as length, tension and the like of respective belts, and the position and posture of the table 20, and three elements or factors (X, Y, and Rotational Torque) applied to the table 20 are obtained by computation of a computer, so that feed-forward control is made possible.

Figure 7:
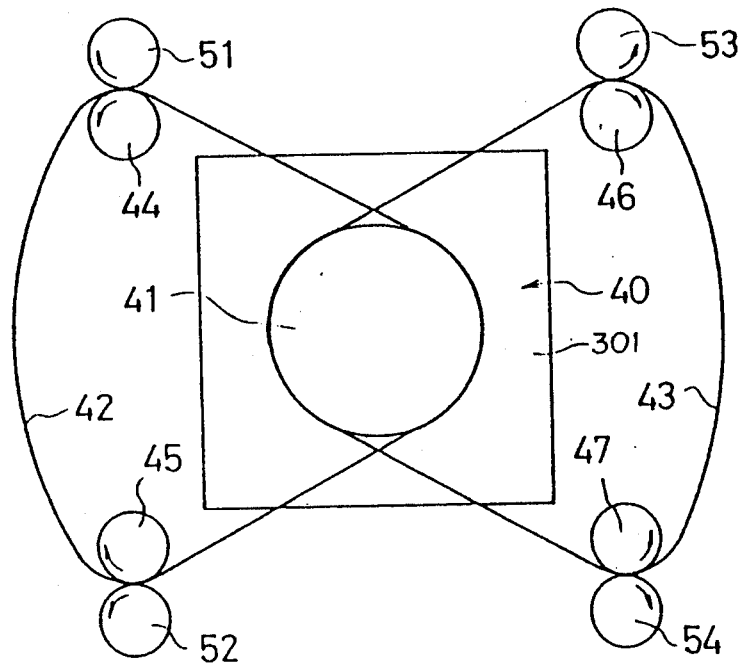
FIGS. 7(A) and 7(B) are views for explanation of a plane motion mechanism a according to a second embodiment of the invention, which uses endless belts.
Figure 7:
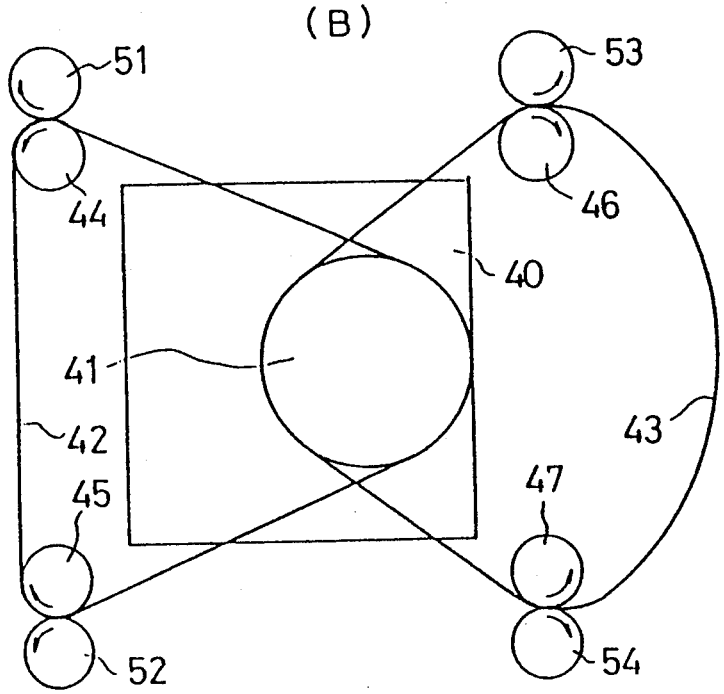

FIGS. 7(A) and 7(B) show a plane motion mechanism according to a second embodiment of the invention. The plane motion mechanism comprises a base 40 having a top planar surface 301, and a table 41 mounted on the top planar surface 301 of the base 40. A pair of endless belts 42 and 43 are wound about an outer peripheral side surface of the table 41 to drive the same. The endless belt 42 passes about a pair of motor pulleys 44 and 45. A pair of tension pulleys 51 and 52 urge the endless belt 42 respectively against the pair of motor pulleys 44 and 45. Similarly, the endless belt 43 passes about a pair of motor pulleys 46 and 47. A pair of tension pulleys 53 and 54 urge the endless belt 43 respectively against the pair of motor pulleys 46 and 47.

Figure 8:
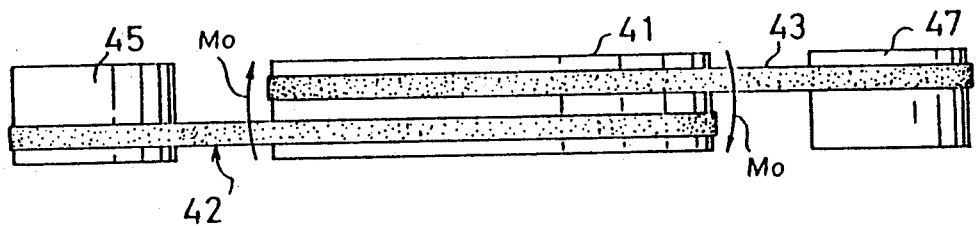
FIGS. 8(A) and 8(B) are views showing how the endless belts illustrated in FIGS. 7(A) and 7(B) are wound about a table.
Figure 8:
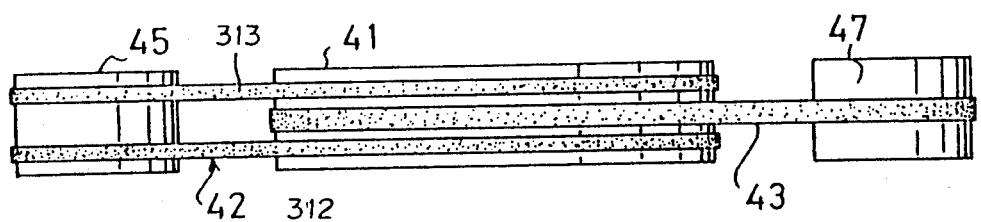

The base 40 and table 41 are the same in construction as the base 10 and the table 20 of the above-described first embodiment. In the arrangement illustrated in FIG. 7(A), however, it is unnecessary to form grooves, along which the endless belts 42 and 43 extend, in the outer peripheral side surface of the table 41. The endless belts 42 and 43 may be wound about the table 41 in a two-stage manner, as shown in FIG. 8(A). Alternatively, as shown in FIG. 8(B), the arrangement may be such that the endless belt 42 is divided into a pair of endless belt sections 312 and 313, and the endless belt 43 and the pair of endless belt sections 312 and 313 are wound about the table 41 in a three-stage manner such that the endless belt 43 extends between the pair of endless belt sections 312 and 313. In this connection, in the case of the two-stage manner illustrated in FIG. 8(A), a moment $M_0$ is generated in a direction indicated by the arrows, if each of the endless belts 41 and 43 is narrow in width. Accordingly, it is desirable that, in order to move the table 41 stably, the endless belt sections 312 and 313 are wound about the table 41 in the manner of three or more stages as illustrated in FIG. 8(B).

The endless belts 42 and 43 are made of steel belts, for example. In order to make low a coefficient of friction of a surface, i.e. a contact surface of each of the endless belts 42 and 43, an antislipping element such as rubber, coating or the like is applied to the contact surface of each of the endless belts 42 and 43. It is of course that the endless belts 42 and 43 may be timing belts, perforation belts or the like.

In the plane motion mechanism constructed as described above according to the second embodiment of the invention, if rotational or angular movement directions, rotational or angular movement speeds and the like of the respective motor pulleys 44 through 47 are programmed beforehand, it is possible to control linear or straight movement and angular movement of the table 41, similarly to the aforesaid first embodiment illustrated in FIG. 1. It is of course that the motion of the table 41 can be controlled by a manual controller such as a joy stick or the like.

Since the plane motion mechanism according to the above-described second embodiment uses the endless belts 42 and 43, there is no limit in number of revolution of the table 41 on the top planar surface 301 of the base 40. Accordingly, it is possible to realize more free motion of the table 41 with an extremely simple arrangement.

Figure 9:
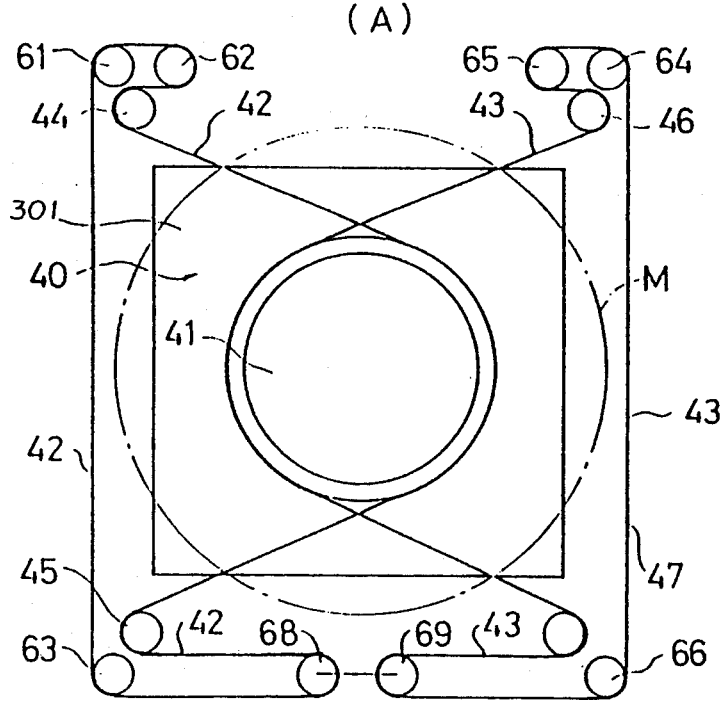
FIGS. 9(A) through 9(D) are views showing a first modification of the second embodiment illustrated in FIGS. 7(A) and 7(B)
Figure 9:
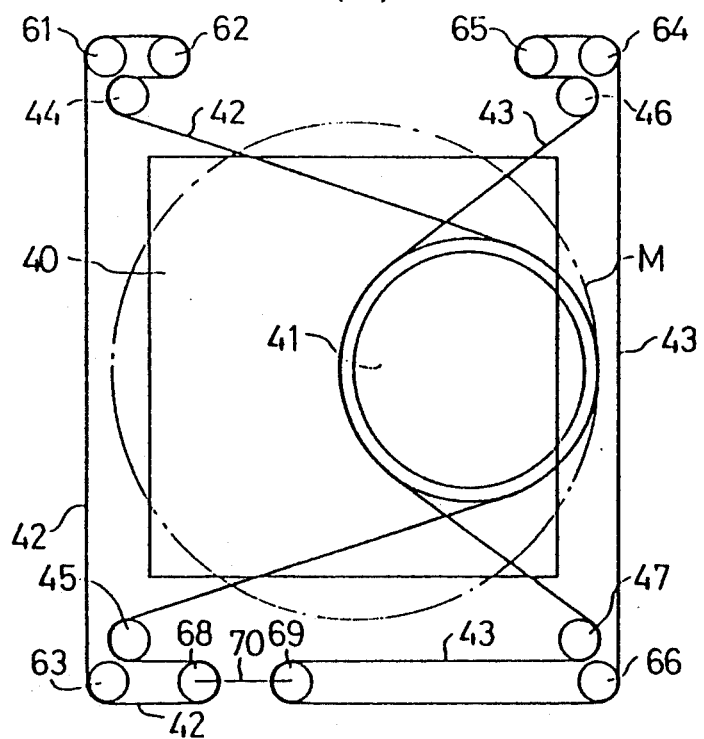
Figure 9:
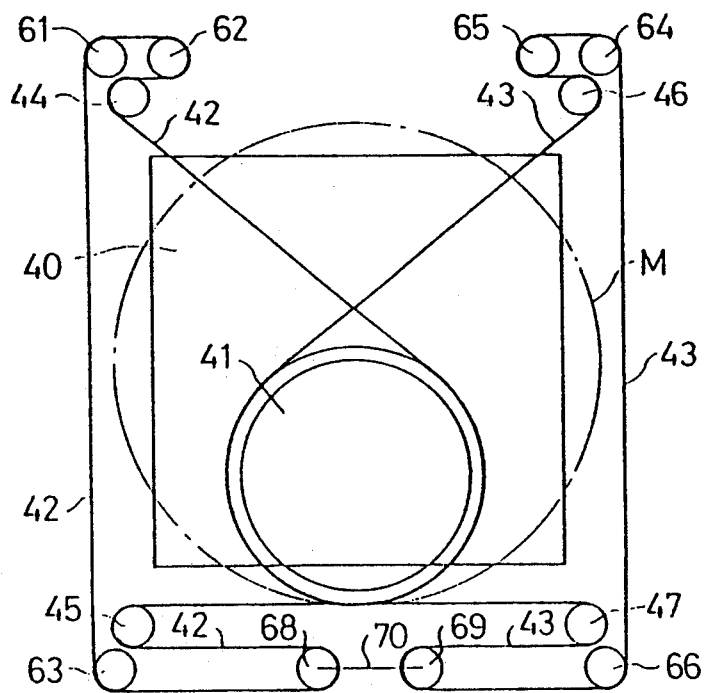
Figure 9:
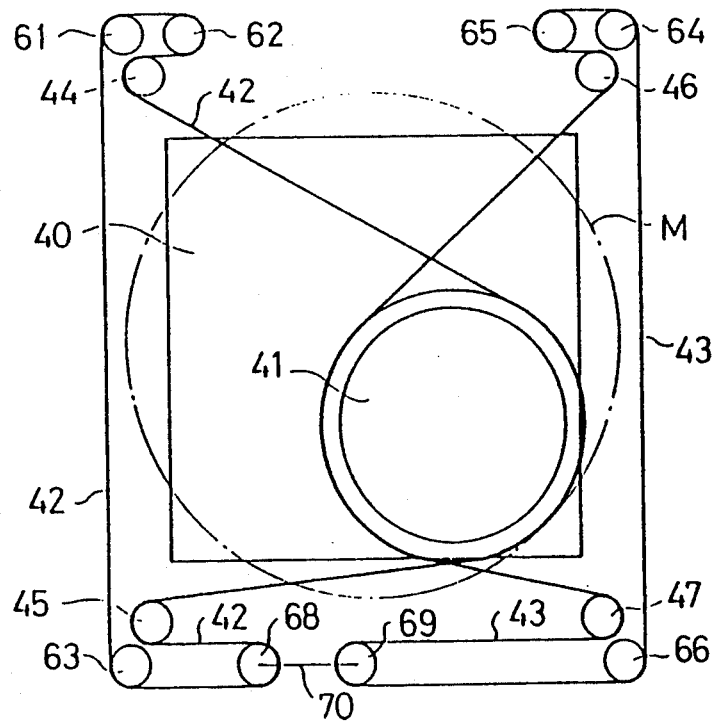

By the way, the plane motion mechanism using the endless belts 42 and 43 has such a disadvantage that, in the case of the simple belt driving type illustrated in FIG. 7(A), the endless belt 43 largely deflects on the side toward which the table 41 moves when it is desired to move the table 41 to the right. FIGS. 9(A) and 9(B) show a first modification of the second embodiment illustrated in FIGS. 7(A) and 7(B), which can prevent the endless belts 42 and 43 from being deflected. The first modification illustrated in FIGS. 9(A), 9(B), 9(C) and 9(D) is the same in arrangement as the second embodiment. Specifically, the table 41 is mounted on the top planar surface 301 of the base 40, the pair of endless belts 42 and 43 are wound about the table 41, and the motor pulleys 44 through 47 drive the pair of endless belts 42 and 43.

The endless belt 42 passes about a tension roller 68 through three guide rollers 61, 62 and 63. Similarly, the endless belt 43 passes about a tension roller 69 through three guide rollers 64, 65 and 68. Although the guide pulleys 61 through 66 are fixed with respect to the base 40, the tension pulleys 68 and 69 are slidable toward and away from each other. As shown in FIGS. 9(C) and 9(D), a coil spring 70 extends between frames of the respective tension pulleys 68 and 69 to pull the same toward each other, to apply substantially constant tensions respectively to the endless belts 42 and 43.

Accordingly, when the table 41 is moved to the right, for example, as shown in FIG. 9(B), slackening or loosening of the endless belt 43 increases, while slackening of the endless belt 42 decreases. By the decrease in slackening of the endless belt 42, the tension pulley 68 is moved to the left in FIG. 9(B). By the increase in slackening of the endless belt 43 and the tension force of the coil spring 70, the tension pulley 69 is also moved to the left. A difference in increasing and decreasing rate of slackening of the endless belts 42 and 43 due to movement of the table 41 is adjusted or regulated by extension and contraction of the coil spring 70.

In the manner described above, if the table 41 is moved to the left, an assembly including the tension pulleys 68 and 69 and the coil spring 70 is moved to the right, while, if the table 41 is moved to the right, the assembly is moved to the left. In this connection, the table 41 can be moved within an area of maximum motion indicated by the broken line M illustrated in FIGS. 9(A) and 9(B).

Figure 10:
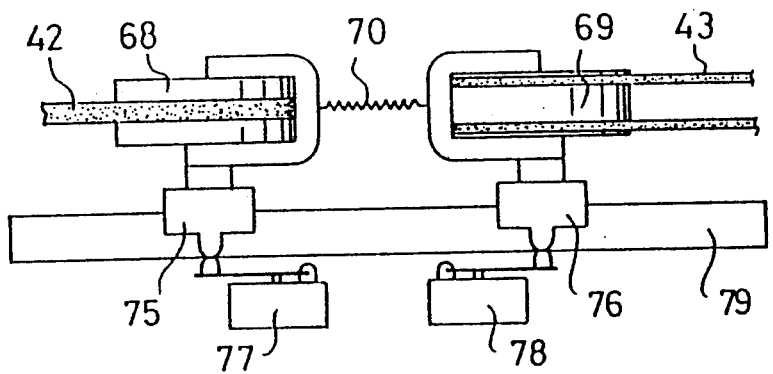
FIG. 10 is a fragmentary side elevational view showing an example of a tension mechanism illustrated in FIGS. 9(A) through 9(D)

FIG. 10 shows an example of an arrangement for returning the table 41 to an original point. The arrangement comprises a pair of sliders 75 and 76 which are mounted respectively to lower surfaces of the respective tension pulleys 68 and 69. The pair of sliders 75 and 76 are movable toward and away from each other along a guide rail 79. The arrangement is such that the sliders 75 and 76 can simultaneously depress operators of respective limit switches 77 and 78 which are arranged at the original position, to detect the original position of the table 41. Specifically, a point, where the sliders 75 and 76 simultaneously depress the operators of the respective limit switches 77 and 78 to turn on an AND circuit, is a original point.

In the case of the belt control illustrated in FIG. 1, it is necessary to detect the number of turns or revolutions of the belts to be rewound and to return the number of turns at the original point. Thus, the program control becomes cumbersome. Further, in the case where a power source is turned off intermediately, data of the belt lengths are erased. Thus, there is a case where it is difficult to return the table to the original point. However, in the case where the belts are formed respectively by endless belts, it is unnecessary to rewind the endless belts about the table through one or more turns. Thus, there is produced an advantage that it is unnecessary to control rotational speed of the table 41.

Figure 11:
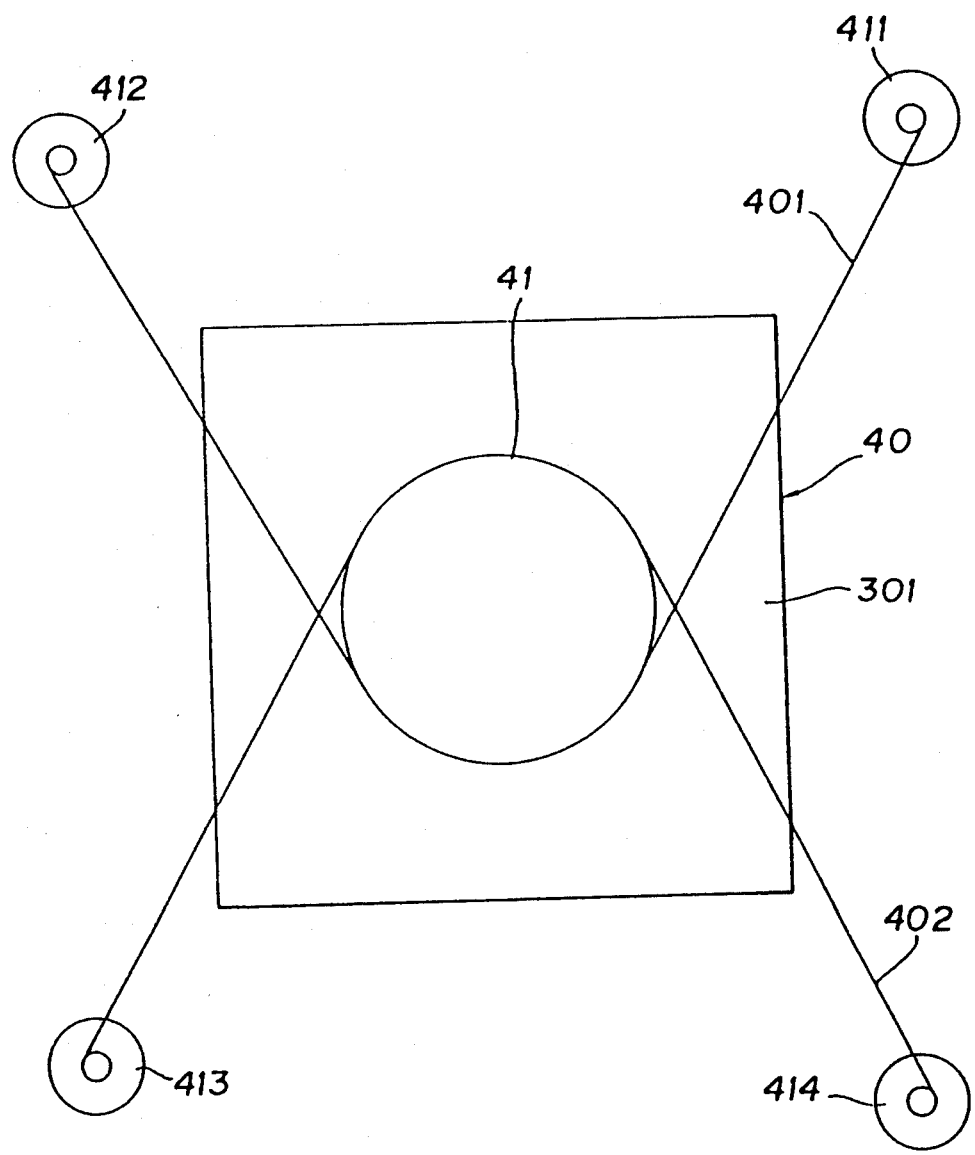
FIG. 11 is a view showing a second modification of the second embodiment illustrated in FIGS. 7(A) and 7(B).

FIG. 11 shows a second modification of the second embodiment illustrated in FIGS. 7(A) and 7(B). In the second modification, a first belt 401 has one end thereof connected to a drive motor 411. The first belt 401 extends about the table 41 on the top planar surface 301 of the base 45. The other end of the belt 401 is connected to an output shaft of a drive motor 412. Similarly, a second belt 402 has one end thereof connected to a drive motor 413. The second belt 402 extends about the table 41 on the top planar surface 301 of the base 45. The other end of the belt 402 is connected to an output shaft of a drive motor 414. It is of course that grooves may be formed in the outer peripheral side surface of the table 41 and an outer peripheral side surface of each of the output shafts of the respective drive motors 411 through 414

In connection with the above, the plane motion mechanism according to the invention is applicable not only to a field of automatization in factories such as processing machines, assembling machines and inspecting and measuring machines, but also to other fields such as display of goods, toys and the like.

What is claimed is:

1. A plane motion mechanism comprising:
   a base having a top planar surface;
   a table mounted on said top planar surface of said base for movement thereon in plane motion, said table having an outer peripheral side surface;
   at least first, second and third elongated power transmitting means each having first and second ends and a first end portion adjacent said first end of each said elongated power transmitting means, each said first end portion being wound about said outer peripheral side surface of said table;
   at least first and second drive means to which said second ends of the respective first and second power transmitting means are connected, for applying tension forces respectively to said first and second power transmitting means; and
   tension-applying means to which the second end of said third power transmitting means is connected, for applying a tension force to said third power transmitting means.

2. A plane motion mechanism according to claim 1, wherein said first and second drive means have their respective output shafts, second end portions of the respective first and second power transmitting means adjacent respectively to said second ends thereof being wound respectively about said output shafts.

3. A plane motion mechanism according to claim 2, wherein said tension-applying means is third drive means having its output shaft, a second end portion of said third power transmitting means adjacent to said second end thereof being wound about said output shaft of said third drive means.

4. A plane motion mechanism according to claim 3, wherein said output shafts of the respective first, second and third drive means are formed. In outer peripheral surfaces of the respective output shafts, with a plurality of grooves, said second end portions of the respective first, second and third power transmitting means being wound respectively about said output shafts of the respective first, second and third drive means, along said grooves.

5. A plane motion mechanism according to claim 1, wherein said outer peripheral side surface of said table is formed therein with a plurality of grooves, said first, second and third power transmitting means having the respective first end portions which are wound about said outer peripheral side surface of said table along said grooves.

6. A plane motion mechanism according to claim 5, wherein said grooves formed in the outer peripheral side surface of said table are annular in plan.

7. A plane motion mechanism according to claim 5, wherein said grooves formed in the outer peripheral side surface of said table are substantially circular in plan.

8. A plane motion mechanism according to claim 1, wherein said tension-applying means is third drive means to which said second end of said third power transmitting means is connected for applying the tension force to said third power transmitting means, and wherein said plane motion mechanism further includes fourth elongated power transmitting means having first and second ends and a first end portion adjacent said first end thereof, said first end portion of said fourth power transmitting means being wound about said outer peripheral side surface of said table, and fourth drive means to which said second end of said fourth power transmitting means is connected for applying a tension force to said fourth power transmitting means.

9. A plane motion mechanism according to claim 8, wherein said first, second, third and fourth power transmitting means are four belts, respectively extending between said table and said first, second, third and fourth drive means through four points forming four corners of a rectangle on said top planar surface of said base, wherein said belts have respective first and second ends, first end portions of the respective belts adjacent respectively to said first ends thereof being wound respectively to said outer peripheral side surface of said table, and wherein said first, second, third and fourth drive means control independently tensions applied respectively to said first end portions of the respective belts which are to be wound about said outer peripheral side surface of said table.

10. A plane motion mechanism according to claim 9, including four cylindrical elements having their respective cylindrical outer peripheral side surfaces, said cylindrical elements being fixedly mounted to said base respectively at said four corners of said imaginary rectangle on said top planar surface of said base, said four belts passing respectively about said cylindrical outer peripheral side surfaces of the respective cylindrical elements so that said four belts are decided in their respective tensile directions.

11. A plane motion mechanism according to claim 9, wherein said first, second, third and fourth drive means are drive motors for pulling said four belts, respectively, and wherein said plane motion mechanism further includes a control unit for controlling said first, second, third and fourth drive motors.

12. A plane motion mechanism according to claim 11, wherein said drive motors have their respective output shafts to which said second ends of the respective belts are fixedly connected, said belts extending respectively about said cylindrical elements, said first ends of the respective belts being fixedly connected to said outer peripheral side surface of said table at their respective predetermined locations.

13. A plane motion mechanism according to claim 10, wherein said table is formed, in said outer peripheral side surface thereof, with a plurality of belt grooves, said first end portions of the respective belts being wound about said outer peripheral side surface of said table respectively along said belt grooves so that said belts are regulated in their respective vertical positions, and wherein each of said cylindrical elements is formed, in its outer periphery with a plurality of belt grooves, each of said belts extending along a corresponding one of the belt grooves in the outer periphery of a corresponding one of said cylindrical elements.

14. A plane motion mechanism according to claim 10, wherein said belts are fixedly connected to said outer periheral side surface of said table at respective points remotest from said cylindrical elements.

15. A plane motion mechanism according to claim 14, wherein said belts extend about said outer peripheral side surface of said table at least one turn.

16. A plane motion mechanism according to claim 1, further including relief means for relieving friction generated between said top planar surface of said base and a lower surface of said table.

17. A plane motion mechanism according to claim 16, wherein said relief means is a polytetrafluoroethylene film which is mounted to the lower surface of said table.

18. A plane motion mechanism according to claim 11, wherein said drive motors are mounted on a side surface of said base so as to extend vertically.

19. A plane motion mechanism according to claim 1, wherein each of said first, second and third power transmitting means is one of a belt, a piano wire and a chain.

20. A plane motion mechanism according to claim 1, wherein each of said first, second and third power transmitting means is made of an engineering plastic material.

21. A plane motion mechanism according to claim 8, wherein each of said first, second and third drive means is one of a DD motor, a DC motor, an AC motor and a brushless motor.

22. A plane motion mechanism according to claim 1, wherein said tension-applying means is spring means to which said second end of said third power transmitting means is connected for applying the tension force to said third power transmitting means, and wherein said plane motion mechanism further includes fourth elongated power transmitting means having first and second ends, a first end portion of the fourth power transmitting means adjacent of said first end thereof being wound about said outer peripheral side surface of said table, and fourth drive means to which said second end of said fourth power transmitting means is connected for applying a tension force to said fourth power transmitting means.

23. A plane motion mechanism according to claim 22, wherein said spring means includes a helical spring.

24. A plane motion mechanism according to claim 10, wherein said first end of each of said belts is fixedly connected to the outer peripheral side surface of said table at a point remotest from a corresponding one of said cylindrical elements.

25. A plane motion mechanism according to claim 4, wherein each of said grooves has a radius of curvature.

26. A plane motion mechanism according to claim 25, wherein each of said belts extends about the outer peripheral side surface of said table through at least one turn.

27. A plane motion mechanism comprising:
a base having a top planar surface;
a table mounted on said top planar surface of said base for movement thereon in plane motion, said table being circular in cross-section and having an outer peripheral side surface;
at least a pair of first and second elongated power transmitting means extending in contact with said outer peripheral side surface of said table to generate friction between said first and second power transmitting means and said outer peripheral side surface of said table; and
a pair of drive means for driving said first and second power transmitting means, respectively.

28. A plane motion mechanism according to claim 27, wherein each of said pair of drive means includes a pair of drive units, each of said pair of first and second elongated power transmitting means having first and second ends which are connected respectively to a corresponding pair of drive units.

29. A plane motion mechanism according to claim 27, wherein each of said pair of drive means includes a pair of drive units, each of said pair of first and second elongated power transmitting means having first and second ends which are fixedly secured respectively to a corresponding pair of drive units.

30. A plane motion mechanism according to claim 28, wherein each of said elongated power transmitting means is one of a steel belt, a timing belt and a perforating belt.

31. A plane motion mechanism according to claim 28, wherein said elongated power transmitting means are wound about said table in a two-stage manner.

32. A plane motion mechanism according to claim 28, wherein one of said elongated power transmitting means is divided into a pair of endless belt sections, and the other of said elongated power transmitting means and the pair of endless belt sections are wound about said table in a three-stage manner such that the other of said elongated power tramsmitting means extends between the pair of endless belt sections.

33. A plane motion mechanism according to claim 29, including two pairs of motor pulleys, the pair of elongated power transmitting means extending respectively between said two pairs of motor pulleys, said two pair of motor pulleys driving said pair of elongated power transmitting means, respectively.

* * * * *

UNITED STATES PATENT AND TRADEMARK OFFICE
CERTIFICATE OF CORRECTION

PATENT NO. : 5,148,716
DATED : September 22, 1992
INVENTOR(S) : Hironharu SUDA

It is certified that error appears in the above-identified patent and that said Letters Patent is hereby corrected as shown below:

On the title page, Item [75]: Inventor's:

Change "Una" to --Uni--.

Signed and Sealed this

Twelfth Day of April, 1994

Attest:

BRUCE LEHMAN

Attesting Officer

Commissioner of Patents and Trademarks